United States Patent [19]

Okamoto et al.

[11] Patent Number: 5,562,358
[45] Date of Patent: Oct. 8, 1996

[54] RIM CLAMPING DEVICE FOR A TIRE UNIFORMITY MACHINE

[75] Inventors: Masayoshi Okamoto; Toshikatsu Nonaka; Katsunobu Hagiwara; Taiji Orimo, all of Takasago, Japan

[73] Assignee: Kabushiki Kaisha Kobe Seiko Sho, Kobe, Japan

[21] Appl. No.: 364,228

[22] Filed: Dec. 27, 1994

[30] Foreign Application Priority Data

Dec. 27, 1993 [JP] Japan .................................... 5-333553

[51] Int. Cl.⁶ .............................. G01M 17/02; F16B 2/14
[52] U.S. Cl. .......................... 403/371; 403/368; 403/365; 73/146
[58] Field of Search ........................... 73/146, 487, 485; 403/31, 374, 371, 369–365

[56] References Cited

U.S. PATENT DOCUMENTS

| | | | |
|---|---|---|---|
| 3,326,585 | 6/1967 | Piecha et al. ............................. | 403/31 |
| 4,574,628 | 3/1986 | Maikuma et al. ........................ | 73/146 |
| 4,598,443 | 7/1986 | Ostling et al. ...................... | 403/371 X |
| 4,616,948 | 10/1986 | Jelfs ...................................... | 403/31 X |
| 4,971,128 | 11/1990 | Koga et al. ............................ | 73/146 X |
| 5,099,684 | 3/1992 | Okamoto ................................. | 73/146 |
| 5,219,387 | 6/1993 | Okamoto ................................. | 73/146 |

FOREIGN PATENT DOCUMENTS

| | | | |
|---|---|---|---|
| 4126897 | 2/1993 | Germany ................................ | 403/31 |
| 6503082 | 9/1965 | Netherlands ........................... | 403/371 |

*Primary Examiner*—Anthony Knight
*Attorney, Agent, or Firm*—Oblon, Spivak, McClelland, Maier & Neustadt, P.C.

[57] ABSTRACT

A device for clamping upper and lower rims to the respective upper and lower spindles of a tire uniformity machine. The device includes wedge component having an outer surface contacting the inner surface of a rim and a tapered inner surface contacting a similarly tapered surface of the spindle, is displaced axially relative to the tapered surface of the spindle. Such axial displacement is translated into a radial displacement of the wedge component as a consequence of the wedge effect between the tapered surface of the wedge component and tapered surface of the spindle. If the wedge component is displaced radially outward, its outer surface pushes against the inner surface of the rim and the rim is clamped through the frictional force between the inner surface of the rim and the outer surface of the wedge component.

6 Claims, 6 Drawing Sheets

FIG. I

F I G. 4
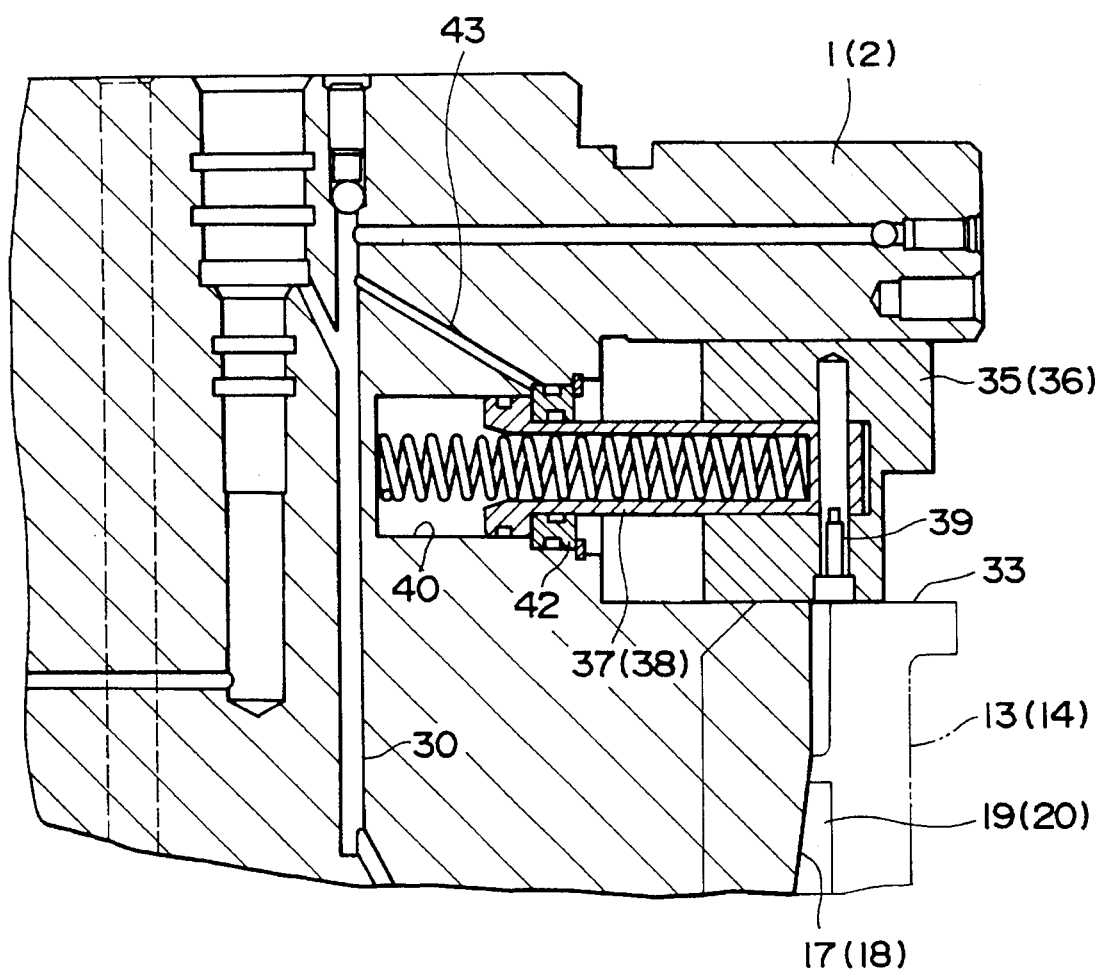

RIM CLAMPING DEVICE FOR A TIRE UNIFORMITY MACHINE

FIELD OF THE INVENTION

This invention relates to a rim clamping device for a tire uniformity machine.

DESCRIPTION OF THE PRIOR ART

In a typical tire uniformity machine, a tire is mounted between upper and lower rims secured onto upper and lower spindles respectively. The tire is then made to rotate by rotating the spindles. The rotating tire is pressed against a drum etc. which serves as a simulated road surface, and the uniformity of the tire is measured.

Actual use of the tire uniformity machine has shown that the tire held between the rims and inflated with compressed air applies a force acting to push the upper and lower rims in the up and down directions respectively, often resulting in a change in the distance between the upper and lower rims. Technology disclosed in Japanese Patent Publication Hei-5 66171 is proposed as means for solving this kind of problem. It employs rings which contract and expand in the radial direction as means for locking the rims from the inner surface thereof. However the following problem exists with these kind of locking means: O-rings are fitted on the upper and lower ends of these rings as oil seals, and these O-rings tend to become eccentric through elastic deformation caused by the side loads experienced thereby with the result that the centering of the rim on the spindle tends to become problematic.

Also, in the above prior art device, stopper blocks inserted for displacement in a radial direction in windows formed in the upper and lower spindles were employed as means for restricting the axial movement of the rims. However because the stopper blocks were each inserted in separate individual windows, it was extremely difficult to ensure that their inner axial surfaces (i.e. the surfaces directed towards the rims) were all located in the same horizontal plane. As a result, the rims tended to lean away from the horizontal with the consequence that the problem of vibration of the rims on the spindles was increased as compared to the same device without the stopper blocks.

The present invention has the objective of providing a rim clamping device in which the above-described problems are resolved.

SUMMARY OF THE INVENTION

According to one basic embodiment of the rim clamping device of the present invention, at least one recess is formed in the circumferential surface of each upper and lower spindle of the tire uniformity machine, wherein said recess is tapered in the axial direction such that its depth decreases from one end to the other. A wedge component is fitted onto said recessed portion for displacement in a radial direction and in a direction parallel to the axis of its corresponding spindle. This wedge component has an inner surface shaped to match the tapered surface of the recess, and an outer surface parallel to the inner surface of its corresponding upper or lower rim. In addition, an actuator is provided as means for displacing the wedge component with respect to its corresponding spindle in a direction parallel to the axis of its corresponding spindle, whereby the wedge component is displaced radially through the wedge effect between the tapered surface of the recess and the tapered surface of the wedge component. In this way vertical displacement of the wedge component is translated into radial displacement of the wedge component and thus the outer surface of the wedge component can be made to push against the inner surface of the rim, thus clamping the rim through the frictional force between the inner surface of the rim and the outer surface of the wedge component.

The surface of the recess may be tapered such that the recess depth decreases continuously from one end to the other or it may be tapered in a series of steps. In either case, the inner surface of the wedge component is shaped to match the tapered surface of the recess.

The recess may be formed over a whole circumference of the spindle. In this case the wedge component is in the shape of an open ended tube and is slipped onto the recess. The inner surface of the tube-shaped wedge component is shaped to match the tapered surface of the recess and the outer surface is parallel to the inner surface of the rim. In order that the tube-shaped wedge component can expand and contract sufficiently, slits are formed in the tube-shaped wedge component. These slits extend in the axial direction from end of the tube-shaped wedge component.

According to another basic embodiment of the rim clamping device of the present invention, a wedge block is supported within each lower and upper spindle for displacement in an axial direction with respect thereto and having at least a portion of its outer surface tapered in the axial direction. At least one window extending from the outer circumferential surface of said spindle through to the tapered surface of said wedge block is formed in each spindle; and a wedge component is supported in this window for radial displacement therein. The inner radial surface of the wedge component is tapered to match the tapered surface of the wedge block and contacts the tapered surface of the wedge block. The outer radial surface of the wedge block is parallel to the inner surface of its corresponding lower or upper rim and contacts the inner surface of its corresponding upper and lower rim. In addition, an actuator is provided for displacing the wedge block in an axial direction.

The axial displacement of the wedge block is translated into radial movement of the wedge component through the wedge effect between the tapered surfaces of the wedge component and wedge block. Thus the wedge component can be made to push against the inner surface of the rim, thus clamping the rim through the frictional force between the inner surface of the rim and the outer surface of the wedge component.

In either of the above basic embodiments, the following structure may be provided as means for restricting the axial displacement of the rim. A groove extending around a whole circumference of each spindle is formed in a portion of the base of each spindle. A plurality of stopper blocks are arranged in this groove in a radial manner and for displacement in a radial direction such that they may be partially protruded from, and retracted into, said groove. An actuator is also provided for displacing these stopper blocks in the radial direction.

When clamping the rims, the stopper blocks are displaced in a radial direction such that a portion thereof protrudes from the groove. In such a position the stopper blocks act to prevent axial displacement of the rims and thus prevent any variation in the distance between the rims caused by the force of the compressed air in the tire acting to push the rims apart during testing.

BRIEF EXPLANATION OF THE FIGURES

FIG. 4 is an enlarged view of the structure of the first embodiment for restricting axial displacement of the upper rim.

DETAILED DESCRIPTION OF THE EMBODIMENTS

Figure 1:
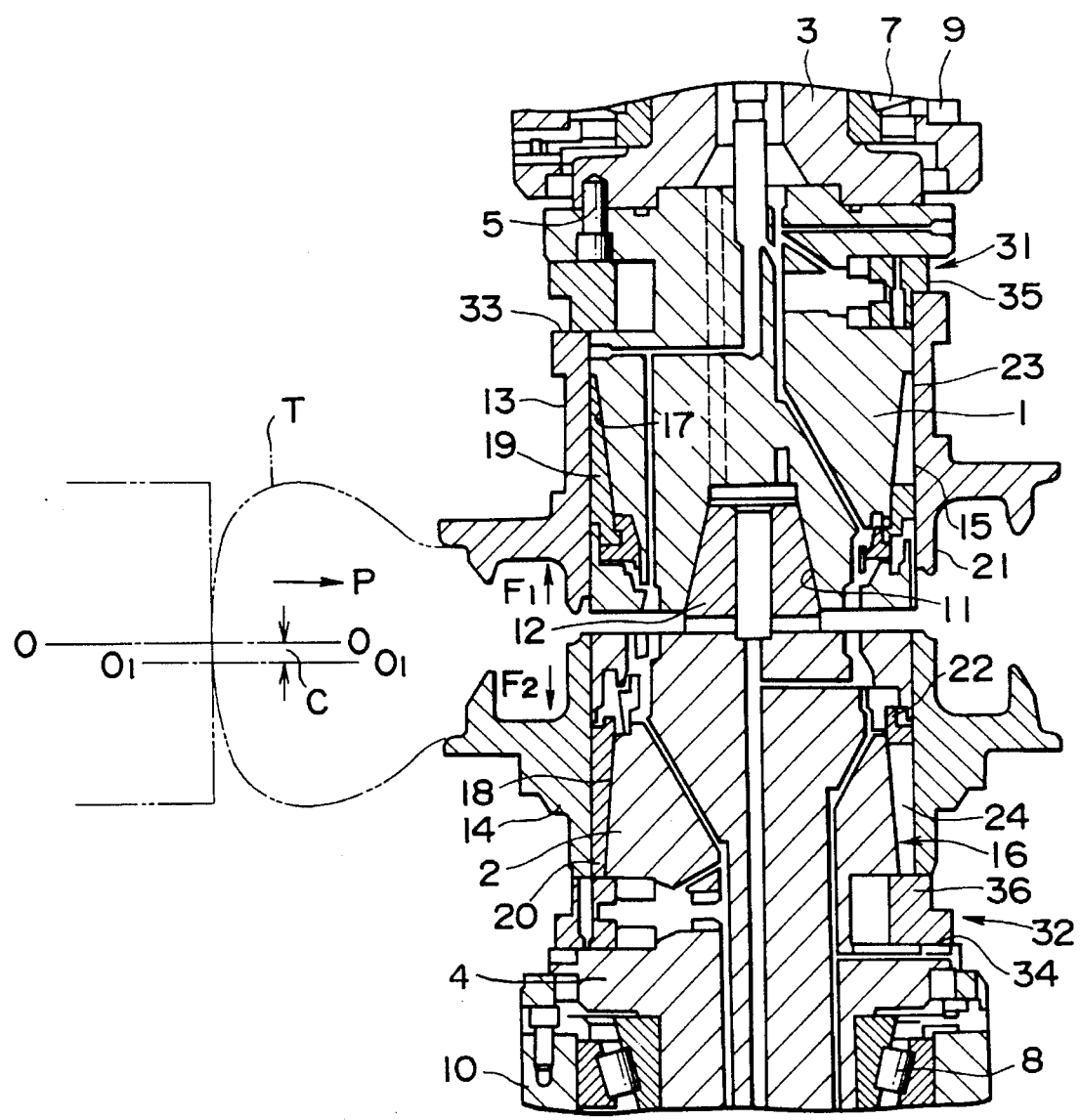
FIG. 1 a vertical cross-sectional view of the first embodiment of the present invention.

Hereunder, some embodiments of the present invention shall be described with reference to the attached figures. Upper and lower spindles 1,2 are fixed by bolts 5 to upper and lower support shafts 3, 4 respectively to face each other about a common central axis. Upper and lower support shafts 3, 4 are supported for rotation through bearings 7,8 in bearing housings 9, 10. Upper spindle 1 is driven for rotation by a motor (not shown), and lower support shaft, together with bearing housing 10, is supported for vertical displacement by lifting means (not shown).

A tapered hole is formed in the center of the lower end of tipper spindle 1, and a tapered projection designed to mate with the tapered hole is formed on the center of the upper end of lower spindle 2, such that when lower spindle 2 is lifted towards upper spindle 1, the tapered hole and tapered projection mate to thereby connect the upper and lower spindles. At the same time, a tire held between upper and lower rims 13, 14 may have an air pressure supplied thereto.

Upper and lower rims 13, 14 may be slideably fitted onto upper and lower spindles 1, 2 respectively such that they may be displaced on and off, and up and down the outer surface of the upper and lower spindles. Also, upper and lower rims may be secured in any desired position through their inner surfaces to upper and lower spindles respectively by locking means 15, 16. Locking means is provided in the following way. The locking means is the same for both the upper and lower spindles and thus only the locking means associated with the upper spindle shall be described in detail. (The reference numerals in brackets designate the corresponding structure of the locking means for the lower spindle). Section 17(18) of the circumferential surface of spindle 1(2) is tapered in the axial direction about its whole circumference. Wedge component 19(20) is fitted onto said tapered section 17(18) such that its outer surface makes contact with the inner surface of the upper rim when the upper rim is mounted on the upper spindle, and for displacement in the axial direction with respect to the tapered section 17(18). Furthermore, an upper hydraulic actuator is also provided for displacing the wedge component 19(20) up and down in the axial direction such that it radially expands and contracts through its wedge action with the tapered section 17(18).

Wedge component 19(20) is cylindrical in shape and has slits 23(24) formed therein extending in the axial direction from one end thereof, in order to facilitate its radial expansion and contraction. The tapered section 17(18) contacting the wedge component 19(20) is tapered continuously in the axial direction.

Figure 2:
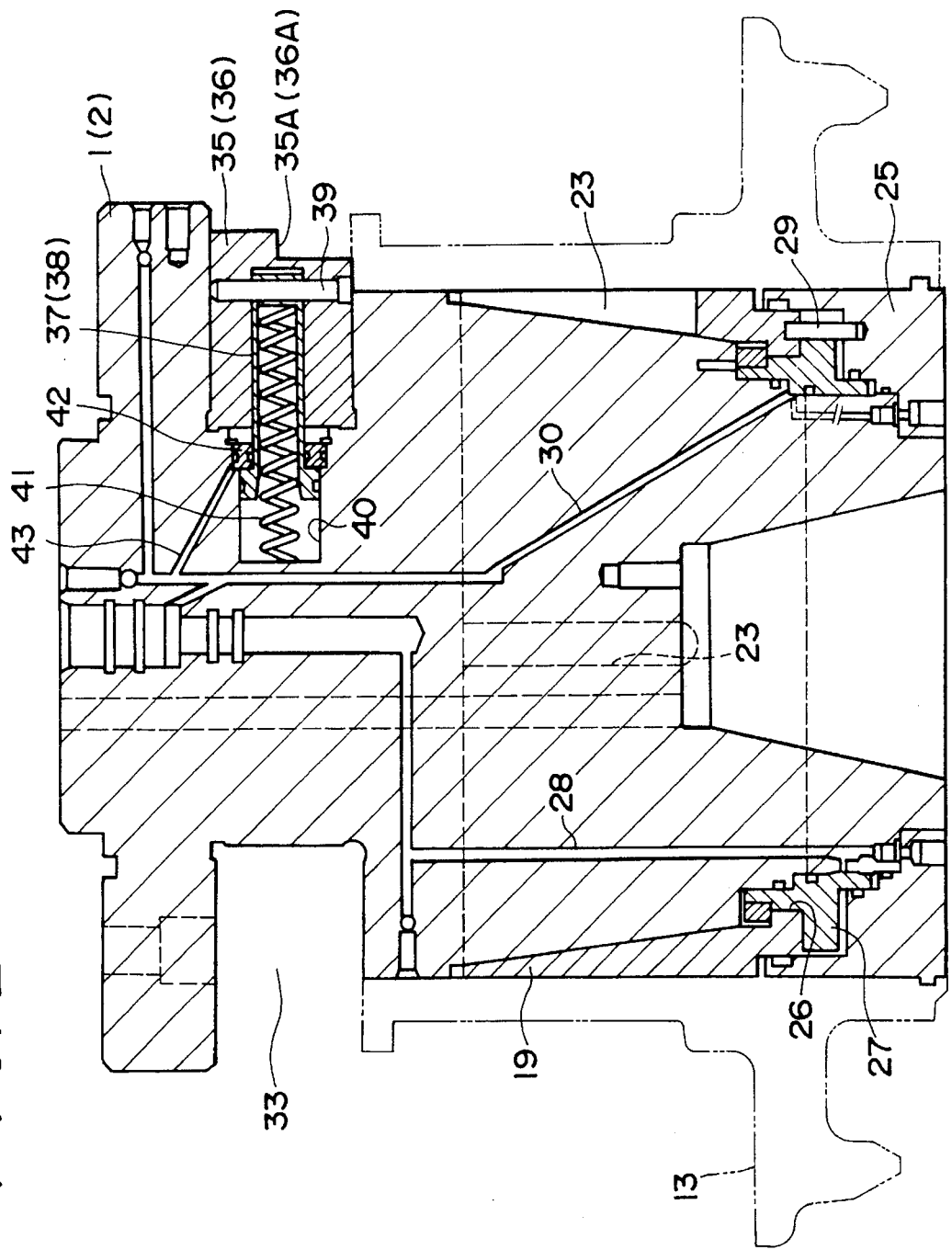
FIG. 2 is an enlarged cross-sectional view of the structure of the first embodiment for clamping the upper rim to the upper spindle.

The structure of the upper hydraulic actuator is shown in detail in FIG. 2. A cylinder chamber 26 is effectively created between wedge component 19, upper spindle 1 and a ring-shaped guideplate 25 fixed by a bolt (not shown) to the lower face of upper spindle 1. A piston 27 is inserted inside this cylinder chamber 27 for vertical displacement therein. Then, if hydraulic fluid is supplied via No. 1 hydraulic line 28 to the lower face of the piston 27, the piston is forced upwards guided by guide pin 29 etc. and upper wedge component 19 is lifted vertically thereby. As upper wedge component 19 is lifted vertically, it expands radially through wedge action with the tapered section 17 to clamp the upper rim by a frictional force. Conversely, if hydraulic fluid is supplied via No. 2 hydraulic line 30 to the upper face of piston 27, the piston is forced downwards and upper wedge component radially contracts under its own elasticity thereby unclamping upper rim 13.

When an air pressure is supplied to the inside of a tire held between upper and lower rims clamped to upper and lower spindles respectively by locking means 15, 16, forces F1, F2 act to push upper and lower rims 13, 14 in the upward and downward directions respectively, and the upper and lower rims can tend to shift out of position as a consequence.

Figure 3:
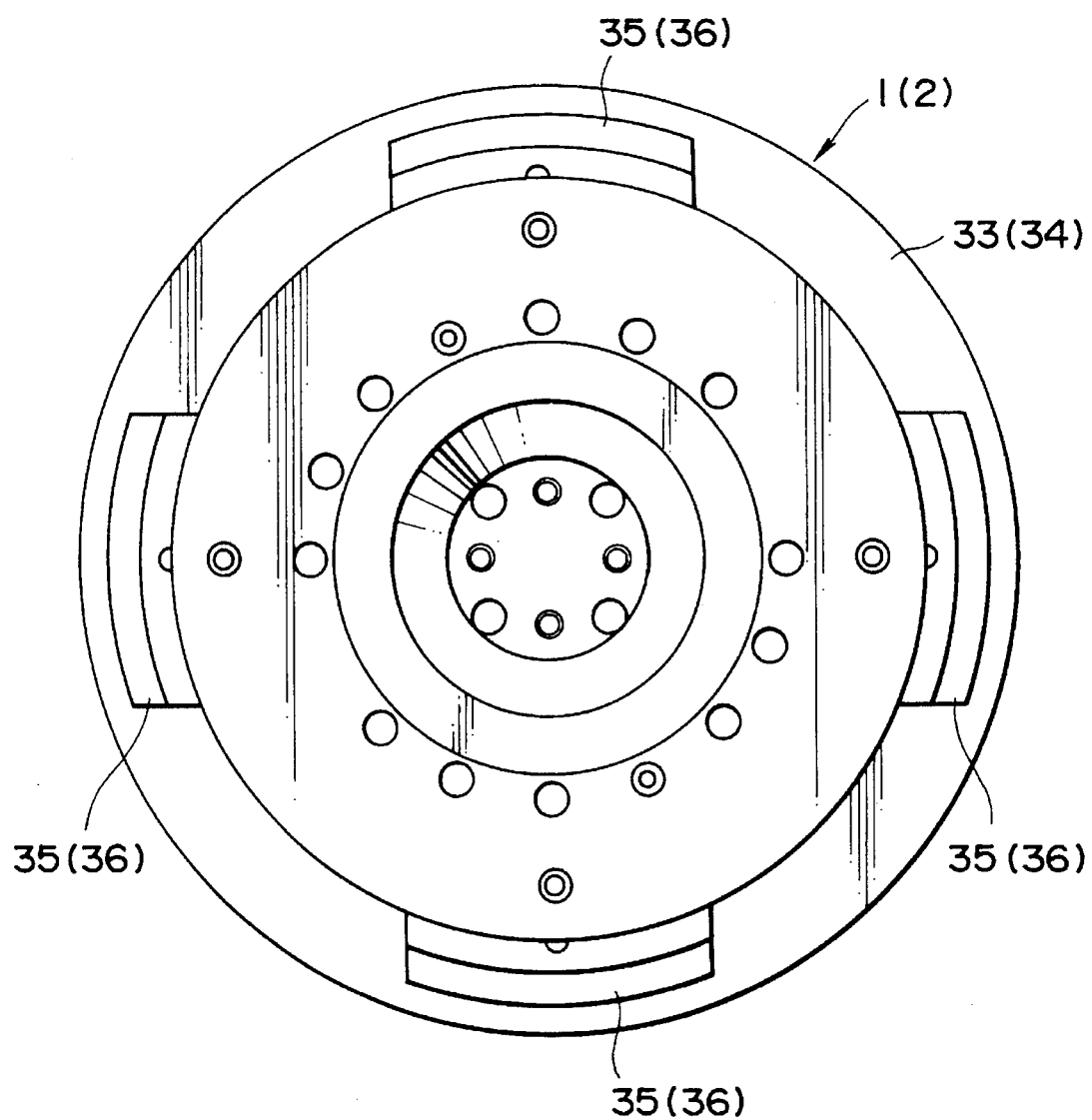
FIG. 3 is an overhead view from above the upper spindle.

In order to prevent this, means 31, 32 for respectively restricting the axial movement of the upper and lower rims is provided on the upper and lower spindles 1, 2 respectively. Since the structure of such means is identical for both the lower and upper spindle, only the structure of the means 31 for restricting the axial movement of the upper rim on the upper spindle shall be described in detail. (Reference numerals in brackets designate the corresponding structure of the means for restricting the axial movement of the lower rim on the lower spindle). A circumferential groove 33(34) is formed in the base portion of upper spindle 1(2). Several stopper blocks 35(36) are inserted in this groove for displacement radially inward or outward, such that as shown in the horizontal cross-sectional view shown in FIG. 3, they are arranged in a radial manner. As shown in FIG. 2, a closed bottom cylinder shaped piston 37(38) is connected by a taper pin 39 to each stopper block 35(36). Several closed-bottom cylinder chambers 40 are formed in a radial manner in the groove 33, each cylinder chamber 40 guiding the radial displacement of one of the pistons 37(38). A coil spring 41 is enclosed within the space created by cylinder chamber 40 and its corresponding piston 37(38), and this coil spring acts to push the piston and hence the stopper block radially outward, such that the stopper block protrudes from the outer circumferential surface of the upper spindle to thus prevent the upper rim from being shifted vertically upwards.

In addition, as shown in FIG. 4, disks 42 whose position is fixed by stop-rings are inserted into piston 37, and when hydraulic fluid is supplied to branch hydraulic line 43 connected to No. 2 hydraulic line 30 to act against the spring, the piston 37(38) together with the stopper block 35(36) are forced radially inward such that the stopper block is brought out of contact with the topside face of the upper rim, thereby no longer restricting the vertical movement of the upper rim.

The outer circumferential face of the stopper block can have a plurality of steps 35A formed thereon such that the position of the upper rim can be adjusted by adjusting the radial position of the stopper block.

Figure 5:
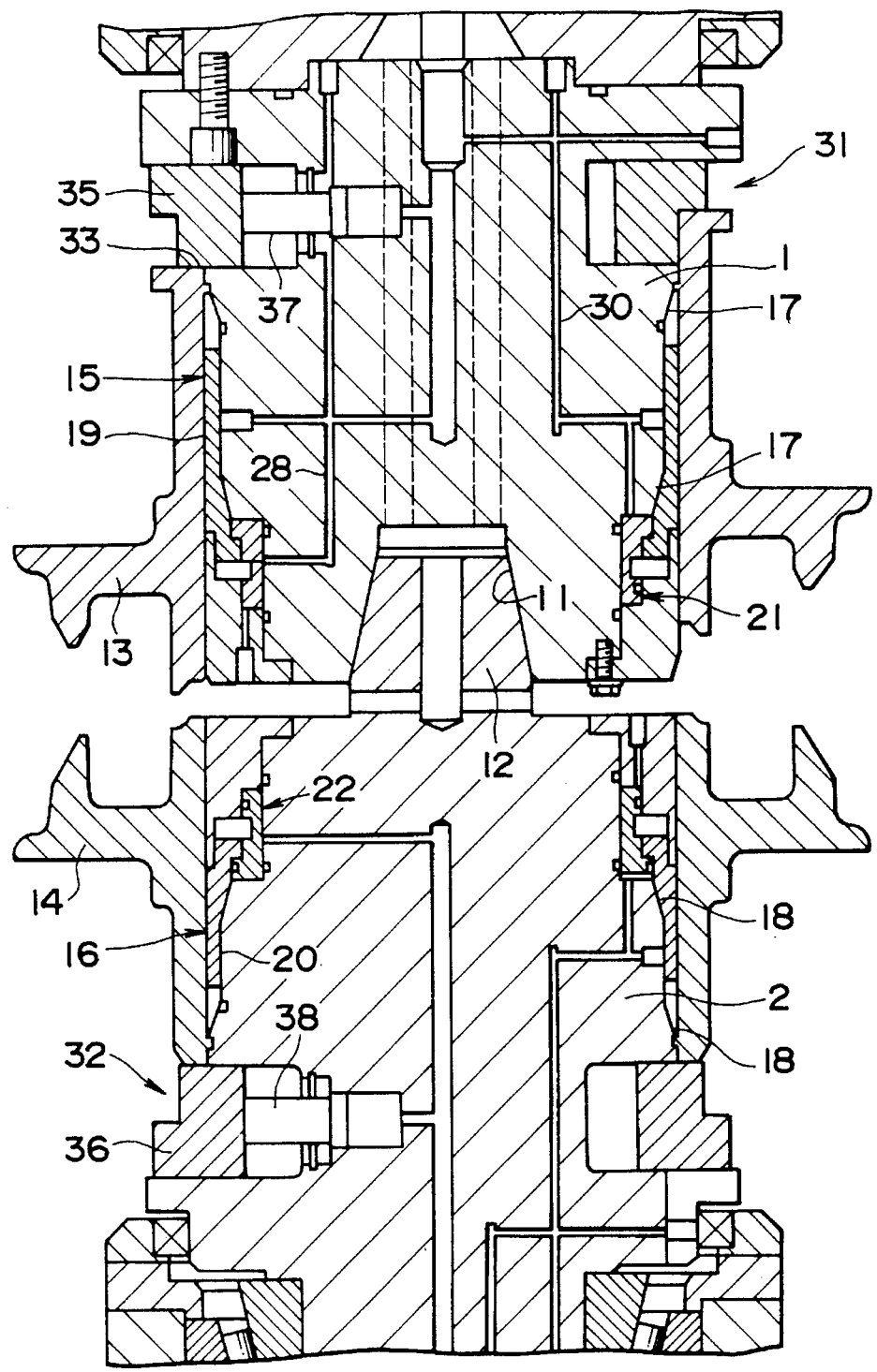
FIG. 5 is a vertical cross-sectional view of the second embodiment of the present invention.

FIG. 5 shows a second embodiment of the present invention. In this second embodiment, the tapered sections 17(18) are not tapered in a continuous fashion, but are tapered in a step-like fashion, i.e. small tapered sections are separated by horizontal sections. Likewise, the inner surface of the wedge components are correspondingly tapered in a step-like fashion.

Also in this second embodiment, the stopper block and piston are combined in one unit; and the switching of the stopper block between a "restricting" position (radial extension) and a "releasing" position (radial contraction) using hydraulic pressure works in tandem with the movement of the hydraulic actuator 21. Namely, the system is designed such that when hydraulic fluid is supplied to the hydraulic actuator to push wedge component 19 into a clamping position, the stopper block 35(36) is displaced into a "restricting" position; and conversely, when hydraulic fluid is supplied to the hydraulic actuator 21 to release wedge components from the clamping position, the stopper block is displaced into a "release" position.

The remaining structure of this second embodiment is the same as that of the first embodiment, and common parts are designated by the same reference numerals.

Figure 6:
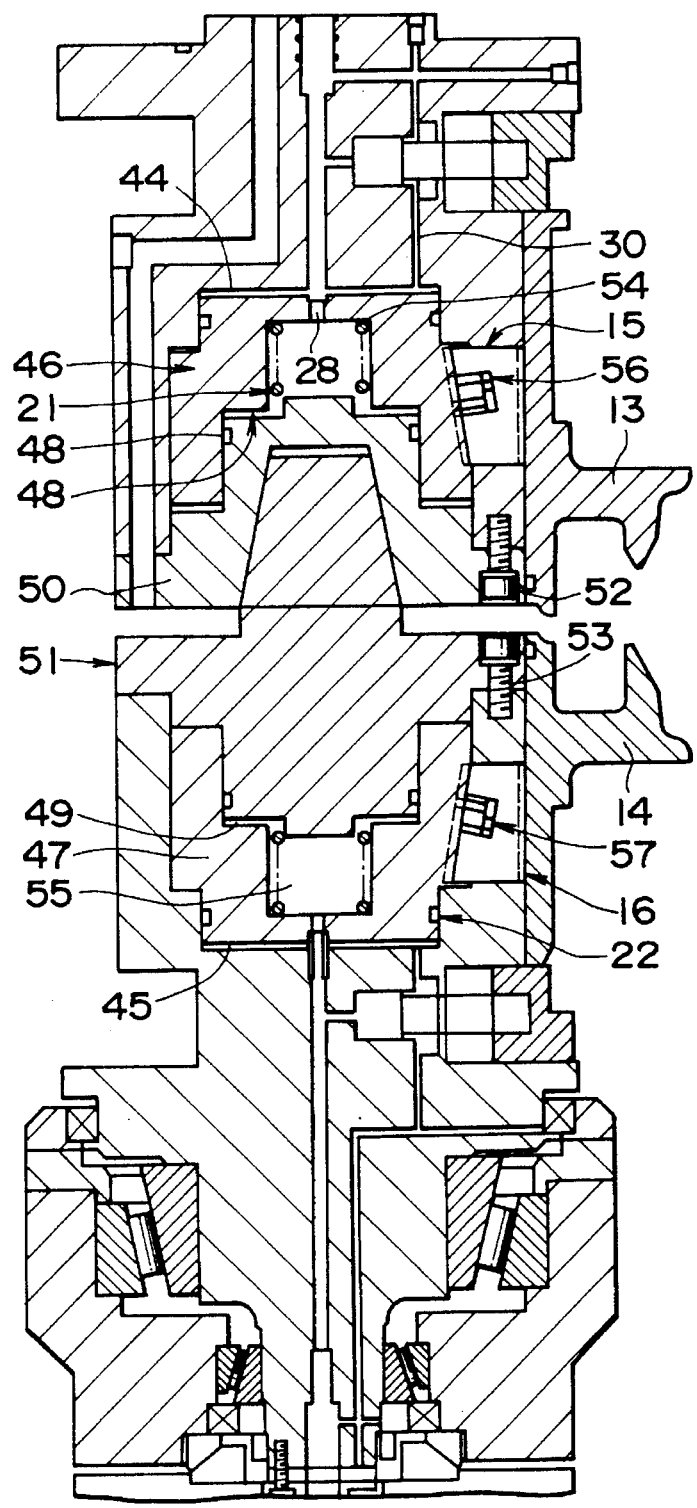
FIG. 6 is a vertical cross-sectional view of the third embodiment of the present invention.

FIG. 6 shows a third embodiment of the present invention. In this third embodiment, the locking means and hydraulic actuators have a different structure to those of the first two embodiments described above. As before, the structure is no different between the upper and lower spindles and thus only the structure associated with the upper spindle shall be described in detail.

A first cylinder 44 is formed in upper spindle 1, and a first piston 46 is inserted into this cylinder such that the first piston 46 may be slideably displaced up and down therein though the action of pressurized fluid. Piston 46 itself has a second cylinder 48 formed therein, and a second piston 50 is inserted in this second cylinder, said second piston being secured to the end face of upper spindle 1 by bolt 52.

Hydraulic fluid may be supplied to first cylinder 44 via No. 2 hydraulic line, and to second cylinder 48 via No. 1 hydraulic line. As shown in FIG. 1, the area against which the hydraulic fluid pushes is much smaller in the case of the second piston/cylinder combination compared to the first piston/cylinder combination, and in consideration of this a spring is incorporated in the second cylinder 48 to provide a force acting to push the first piston upwards.

Sections of the wide diameter portion of the body of piston 46 are tapered in the axial direction. These sections are spaced around the outer circumference of the piston 46. Wedge components 19 are connected to each of these tapered sections 17 through guide pin 56 for displacement in a horizontal direction relative to said piston 46. These wedge components are inserted into windows formed in the upper spindle 1, such that their outer surfaces contact the inner surface of the upper rim 13.

Then, when hydraulic fluid is supplied to the second cylinder 48 via No. 1 hydraulic line 28, piston 46 is forced upwards with the help of the action of the spring, and wedge component 19 is forced outward through the wedge action with the tapered section of piston 46 to push against the inner surface of the upper rim 13 thereby clamping the upper rim 13 through a frictional force. At the same time, the stopper block 35 is pushed radially outward to thereby restrict the upward movement of the upper rim 13. Conversely, when hydraulic fluid is supplied to first cylinder 44 via No. 2 hydraulic line, the first piston is forced downwards against the action of the spring, and the wedge action between the wedge components 19 and the tapered section of the piston 46 is released to thereby unclamp the upper rim 13. At the same time, stopper block 35 is retracted radially inward such that the upward movement of the rim is no longer restricted.

What is claimed is:

1. Rim clamping device for effecting the clamping of upper and lower rims fitted onto the upper and lower spindles of a tire uniformity machine, comprising:

at least one recess formed in the circumferential surface of each upper and lower spindle, wherein said recess is tapered in the axial direction such that its depth decreases from one end of the recess to the other;

a wedge component fitted onto said recess wherein said wedge component has an inner surface shaped to match the tapered surface of said recess, and an outer surface parallel to the inner surface of its corresponding rim, and wherein said wedge component is displaceable with respect to its corresponding spindle in a radial direction and in a direction parallel to the axis of its corresponding spindle; and an actuator comprising a piston movable in a cylinder, said piston coupled to said wedge component for displacing said wedge component in a direction parallel to the axis of its corresponding spindle whereby said wedge component is displaced radially into direct contact with its corresponding rim through a wedge action between the inner surface of the wedge component and the tapered surface of said recess.

2. The rim clamping device according to claim 1 wherein said recess is tapered such that its depth decreases continuously from one end to the other.

3. The rim clamping device according to claim 1 wherein said recess is tapered in steps.

4. The rim clamping device according to claim 1 wherein said recess extends around the entire circumference of the spindle, and said wedge component is a tube shaped wedge component having slits formed therein said slits extending in the axial direction from one end of said tube shaped wedge component.

5. The rim clamping device according to claim 1 further comprising:

a groove formed in a portion of the base of, and extending around a whole circumference of, each lower and upper spindle;

a plurality of stopper blocks mounted in said groove for displacement in a radial direction such that they may be at least partially protruded from, and retracted into, said groove; and at least one actuator for displacing said stopper blocks in the radial direction.

6. Rim clamping device for effecting the clamping of upper and lower rims fitted onto the upper and lower spindles of a tire uniformity machine, comprising:

a wedge block supported within each upper and lower spindle for displacement in an axial direction with respect thereto, said wedge block having at least a portion of its outer surface tapered in the axial direction;

at least one window formed in each spindle, said window extending from the outer circumferential surface of said spindle through to the tapered surface of said wedge block;

a wedge component supported in said window for radial displacement therein, wherein the inner surface of said wedge component is tapered to match the tapered surface of said wedge block and contacts the tapered surface of said wedge block, and wherein the outer surface of said wedge block is parallel to the inner surface of its corresponding lower or upper rim; and an actuator for displacing said wedge block in an axial direction whereby said wedge component is displaced radially into direct contact with its corresponding lower or upper rim through a wedge action between the inner surface of the wedge component and the tapered surface of said wedge block.

\* \* \* \* \*